OUT-OF-LINE TO IN-LINE NUMERAL DISPLAY

Filed June 23, 1958 4 Sheets-Sheet 1

Inventor:
Horace R. Finney
By Rudolph J Janik
Attorney

Inventor:
Horace R. Finney
By Rudolph J. Jurick
Attorney

Inventor:
Horace R. Finney
By Rudolph J. Jurick
Attorney

Inventor:
Horace R. Finney
By Rudolph J. Jurick
Attorney

United States Patent Office 3,165,728
Patented Jan. 12, 1965

3,165,728

OUT-OF-LINE TO IN-LINE NUMERAL DISPLAY

Horace R. Finney, Denville, N.J., assignor to Radio Frequency Laboratories, Boonton, N.J., a corporation of New Jersey Filed June 23, 1958, Ser. No. 743,857
1 Claim. (Cl. 340—324)

This invention relates to a converter for presenting in one viewing area visual information which is ordinarily presented at separate, displaced, viewing areas, which converter is particularly adapted for use in obtaining an in-line read out of the information display of decade counter units of a counting instrument.

Counters, and in particular, frequency counters, are adapted to total, or count, the number of impulses arriving at the input thereof during controlled intervals of time, and may be used in the measurement of physical, electrical, or chemical parameters, and the like. Normally, the pulse count information is read out of the counter circuit on a plurality of decade counter units, each of which includes the decimal values 0–9 arranged in a vertical column, with each digit appearing at a separate viewing area. If a total of five (5) decade counters are used, for example, the values between 0 and 99999 may be indicated thereon, by illuminating any one numeral in each decade counter unit. Ordinarily, the numerals are lit momentarily at periodic intervals of time.

With the above, common, prior art read out arrangement employing a plurality of decade counter units, it will be apparent that reading of the counter total, as the numerals are momentarily lighted, is relatively difficult since a large area must be scanned in order to ascertain which digit in each column of digits is illuminated. The difficulty encountered in reading the decade counter units arises primarily, then, from the fact that each individual digit is located in a separate, individual, viewing area. The apparatus of my invention is used to convert the scattered, hard to read, out-of-line digital information provided by the decade counter units, to an easily read, in-line presentation of the information.

The conversion system of my invention includes one or more electronic indicator devices, such as, electron tubes of the type having a plurality of individually illuminable digits, each of which are displayable in a common viewing area, and each digit in the indicator tube corresponding to an illuminable digit in the decade counter unit. Included in the system are a plurality of photo-sensitive cells of the type which exhibit a large change in internal resistance with a change in the light intensity striking the same, which photo-resistive cells are individually responsive to the illumination from the digits of the decade counter units. Suitable circuitry, including a source of potential, connects the output terminals of each photo-resistive unit to individual digits of the numerical indicator tubes, or devices. Light from the illuminated decade counter unit digit strikes the photo-resistive cell lowering the resistance thereof. With reduced resistance, the corresponding digit in the numerical indicator tube, or device, is lighted. In this manner, the digits which appear at separate viewing areas in the read out of the decade counter unit are presented at a single viewing area in the numerical indicator tube, or device. A separate numerical indicator tube, or device, is used for each decade counter unit included in the frequency counter instrument. Since the numerical indicator tubes may be arranged in an in-line orientation, the ordinary out-of-line read out of a frequency counter having a plurality of decade counter units is easily converted to an in-line read out.

An object of this invention is the provision of an apparatus for presenting at one viewing area information which ordinarily appears at separate areas.

An object of this invention is the provision of a converter apparatus for use on a counter device having a plurality of decade counter units, which device converts the out-of-line digital read out of the counter to an in-line read out.

An object of this invention is the provision of a converter for use with a frequency counter which includes a plurality of decade counter units having a plurality of illuminable digits, the said converter device comprising a reading head having a plurality of photo-sensitive elements which are individually responsive to the illumination of the decade counter unit digits, a read out unit comprising a plurality of electronic indicator devices each having a plurality of individually energized elements visible at a common viewing area and corresponding to the decade counter unit digits, and means connecting the individual photo-sensitive elements to the corresponding individually energized elements of the indicator devices, the informational display of the said indicator devices being in an in-line orientation.

An object of this invention is the provision of a read out arrangement for a decade counter unit having a plurality of illuminable information elements at spaced distances apart, each of which may represent an individual decimal digit, the said read out arrangement comprising a plurality of photo-sensitive cells individually responsive to illuminated decade counter unit elements, a numerical indicator device having digits displayable in a common viewing area and each digit therein corresponding to the illuminated decade counter unit element, and means connecting the individual photo-sensitive cells to the said indicator device digits to light the digit corresponding to the illuminated decade counter unit element.

These and other objects and advantages will become apparent from the following description when taken with the accompanying drawings. It will be understood that the drawings are for purposes of illustration and are not to be construed as defining the scope or limits of the invention, reference being had for the latter purposes to the appended claims.

In the drawings, wherein like reference characters denote like parts in the several views.

Figure 1:
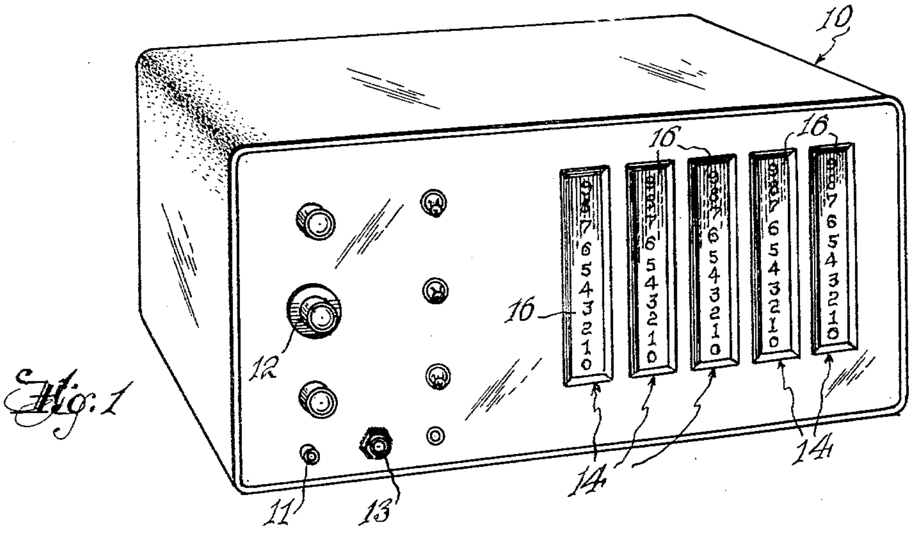
FIGURE 1 is a front perspective view of a typical frequency counter with which my novel converter device is adapted to be used.

Reference is first made to FIGURE 1 of the drawings wherein there is shown a front perspective view of a typical frequency counter 10 of the type with which my novel converter apparatus is adapted to be used. Electrical pulses to be totaled, or counted, are connected to the input terminal 11 of the counter, while the time interval during which the pulses are to be totaled is controlled either by an internal time base control having an adjusting knob 12 at the instrument panel, or by a suitable external source adapted to be connected to the instrument through a terminal connection 13. With either time base control, the pulse count information is displayed upon a plurality of decade counter units 14, which units are shown to be of the usual type, and include a mask 16 with the digits 0–9 thereon. Individually energized sources of illumination are located behind each digit in the counter units. As is understood by those skilled in this art, one digit in each counter unit is adapted to be lighted at any one time, through action of the counter circuitry, whereby a counter which includes five (5) decade counter units, as shown, is adapted to indicate totals between 0 and 99999.

It will be seen that with the counter of the type shown which utilizes a plurality of decade counter units, each digit of each decade counter unit 14 is located in a separate viewing area. Therefore, to read the total presented, each counter unit must be scanned to determine which digit is lit, or illuminated. Ordinarily, the digits are repeatedly illuminated only momentarily, whereby reading of the total presented may be very difficult. Unless each digit in the total is identical, it will be apparent that the digital information will be presented in an out-of-line manner. If the total indicated involves widely scattered digits, it will be apparent that the observer's eye would have to scan a considerable viewing area in order to read out the information.

The apparatus of my invention is adapted to convert the out-of-line read out, such as is obtained from the frequency counter of FIGURE 1, to a read-out wherein each digit of the total, regardless of the actual total, is presented in one viewing area. My converter apparatus is arranged to present an in-line display of the information since most individuals are accustomed to comprehend with ease numbers in which the digits are arranged in-line, and in particular, in-line horizontally. Regardless of how scattered the digits of the total are on the frequency counter, the apparatus of my invention converts the information to an easily read, in-line, presentation.

Figures 2, 3:
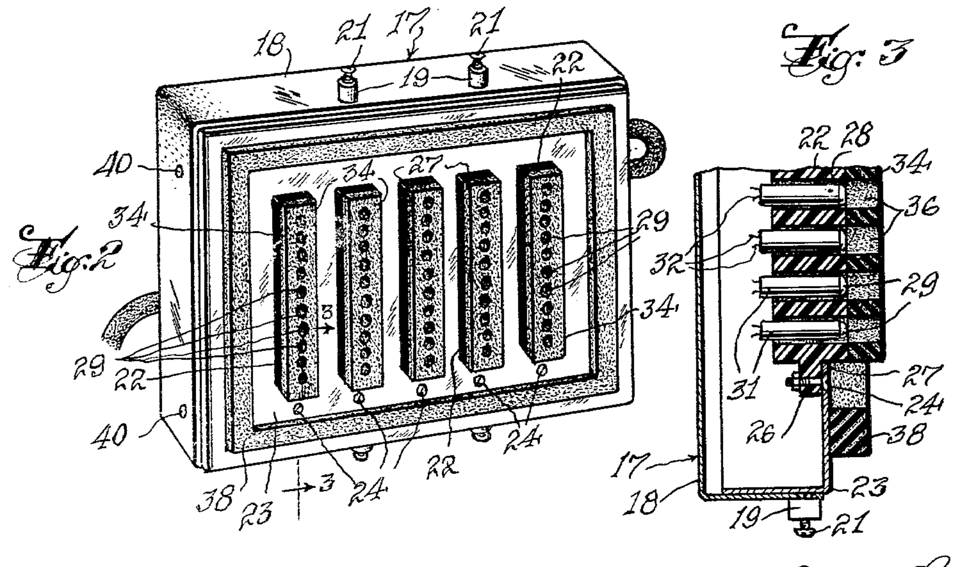
FIGURE 2 is a rear view of a reader head embodying my invention, and which is adapted to be fastened to the counter of FIGURE 1.
FIGURE 3 is a sectional view taken on line 3—3 of FIGURE 2.
Figure 4:
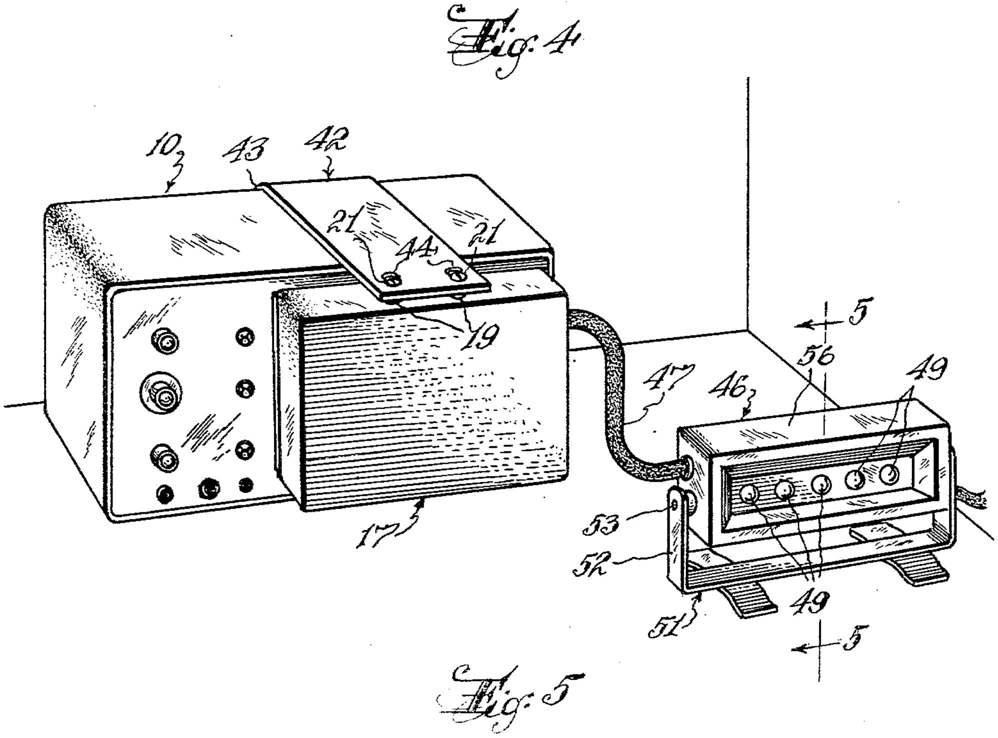
FIGURE 4 is a perspective view of a frequency counter with the reader head of FIGURE 2 attached thereto, and including a remote read out unit.

In one embodiment of my invention, the converter apparatus includes a reader head which is adapted to be mounted to the frequency counter 10. Reference is made to FIGURE 2, wherein there is shown a rear perspective view of the reader head, designated by the reference numeral 17, which comprises a generally rectangular-shaped housing 18 having posts 19 secured to the top and bottom thereof (only the upper posts being visible in FIGURE 2). Screws 21 threadedly engaging the posts are used in securing the said reader head 17 to the frequency counter, as is shown in FIGURE 4 and described below. Referring now, also, to FIGURE 3, which is a fragmentary sectional view taken on line 3—3 of FIGURE 2, five generally rectangular-shaped mounting strips 22 are secured to the rear cover 23 of the reader head by screw fastening devices 24 which extend through the cover and flanges 26 adjacent the ends of the mounting strips 22, (only one mounting strip 22 being visible in FIGURE 3). The mounting strips extend through apertures 27 formed in the rear cover 23. A plurality of through holes 28 are formed in the mounting strips 22, within which holes the photo-sensitive cells 29 are mounted. The photo-sensitive cells 29 comprise generally flat, disc like members which are shown mounted in a cylindrical glass envelope 31, in FIGURE 3. Lead wires 32 from the photo-sensitive elements 29 extend from the rear of the envelopes 31. For a frequency counter in which the illumination from the digits is rich in red and/or infra-red rays, photo-sensitive elements of cadmium selenide are suitable, such elements exhibiting a large change in resistance with changes in the light intensity striking the same. Furthermore, the envelope, or cell vial 31, is preferably formed with an end member in the form of a lens, thereby providing a lens action between the photo-sensitive element and the light source from the counter digits.

The photo-resistive elements 29 are mounted within the mounting strips 22 in spaced relation corresponding to the spacing of the digits on the counter units 14, for the particular frequency counter with which the reader head is to be used. In this manner, the individual photo-sensitive elements 29 are individually responsive to the light from each counter digit. Resilient plastic, sponge, or foam, rubber members 34, having holes 36 extending therethrough, which are in alignment with the holes 28 in the mounting strip, are suitably secured to the mounting strip 22, as by gluing, or other suitable means. In addition, rearwardly extending resilient rubber, plastic, or the like, members 38 are secured adjacent the periphery of the rear cover 23. When the reader head 17 is secured to the frequency counter 10, the resilient members 34 and 38 closely abut the mask 16 and front panel, respectively, of the frequency counter, and prevent outside light from striking the photo-resistive elements 29. In addition, a light-tight connection is maintained between the housing 18 and rear cover 23, which are secured together by screws 40.

Reference is now made to FIGURE 4 of the drawings wherein there is shown a front perspective view of the frequency counter 10 to which the reader head 17 is attached by means of upper and lower brackets 42 of identical design (only the upper bracket being visible). A flanged end 43 at the rear of the bracket abuts the rear of the frequency counter, while a pair of holes 44 are located adjacent the front of the brackets, through which the mounting screws 21 extend. In the attached position, as shown, it will be understood that the reader head 17 must be properly aligned whereby the light from the illuminable counter digits strikes the individual photo-sensitive elements in the reader head. Obviously, any suitable fastening device, with any suitable means for aligning the reader head on the counter, may be used. For example, in certain models of frequency counters, screws extend into the front panel of the counter adjacent the decade counter units. Such screws may be used to both fasten the reader head to the frequency counter, and to accurately position the same. In the illustrated frequency counter and reading head, the rubber members 34 adjacent the photo-sensitive members, abut the masks 16 of the decade counter units, which are recessed behind the front panel of the frequency counter, to properly orient the reading head on the counter.

In FIGURE 4, I have shown a remote read out unit 46 connected to the reader head 17 through an electrical cable 47, whereby the read out unit may be placed anywhere within the length of the cable from the reader head. The read out unit shown is provided with five (5) indicator tubes 49 of the type which include (10) digits, 0 through 9; see, for example, FIGURES 1, 2 and 3 of the Boswu patent, No. 2,142,106. When a suitable potential is connected across a tube between the anode and one of the cathodes, that cathode glows, and becomes clearly visible. Through suitable circuit connections from the photo-sensitive cells in the reader head 17, shown in FIGURE 6, and described below, it will be understood that any one of the digital-shaped cathodes on the indicator tubes may be lighted in response to illumination from the decade counter units of the frequency counter. Since the tubes 49 are arranged in-line in the read out unit, the out-of-line read out of the frequency counter is converted to an in-line presentation at the read out unit.

The read out unit 46 is shown mounted upon a base 51 comprising a U-shaped bracket 52, whereby the unit is free to be pivoted about the mounting pins 53 adjacent the ends of the parallel arm portions of the bracket. Thus, the read out unit may be supported upon the upper side of a generally horizontal surface, in the position shown, or hung downwardly from the bottom side of a shelf, or the like, if desired.

Figure 5:
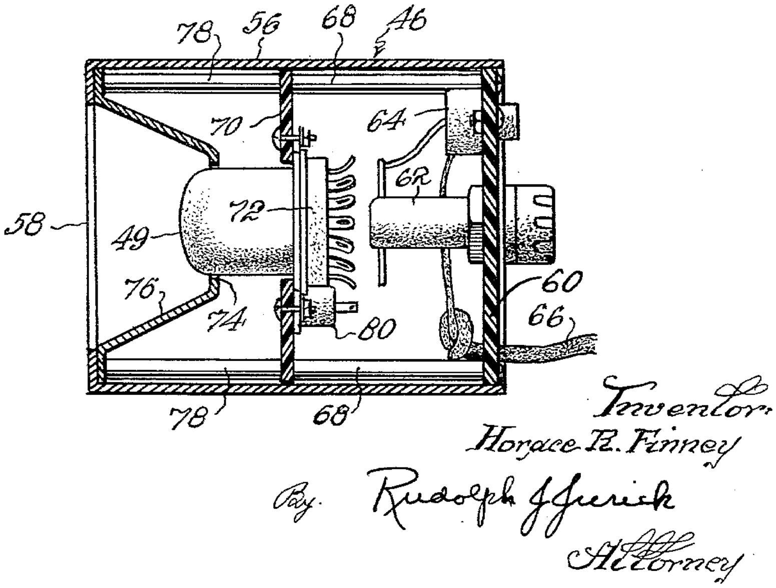
FIGURE 5 is a sectional view of the reader head taken on line 5—5 of FIGURE 4.

Reference is now also made to FIGURE 5 wherein there is shown a vertical sectional view of the read out unit taken on line 5—5 of FIGURE 4. The read out unit includes a housing 56 which is open at the rear and is provided with an aperture 58 at the front thereof. A rear mounting panel 60, of insulating material supports a fuse holder 62 and switch 64 through which the line cord 66 is connected. Forward extending posts 68 are secured to the rear mounting panel and support an intermediate panel 70. Tube sockets 72 are secured to the intermediate panel 70 and support the numerical indicator tubes 49. The viewing end of the tubes extend outwardly through apertures 74 in a front panel 76 which, in turn, is supported upon posts 78 extending from the front of the intermediate panel 70. The front panel is provided with tapered side walls whereby the indicator tubes 49 are shielded from much outside light. In addition, the outer surface of the front panel may be coated with a suitable dark material to reduce the light reflection therefrom. Potentiometers 80 are secured to the intermediate panel 70, and provide means of adjustably controlling the current which is drawn through the indicator tubes 49, as will be seen in the diagrammatic presentation of the wiring arrangement of FIGURE 6.

Figure 6:
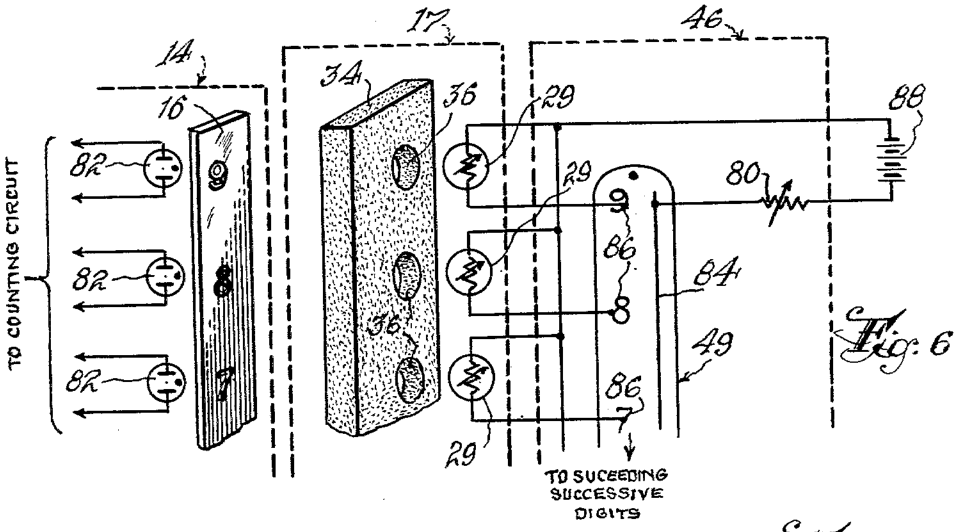
FIGURE 6 shows a fragmentary portion of the wiring arrangement for my converter.

Referring to FIGURE 6, a fragmentary portion of a single decade counter unit 14 is shown, which includes the mask 16 with the digits therein. Light sources 82, which may comprise neon lamps, for example, are positioned behind the digits in the mask. The light sources are adapted to be individually energized by the output from the frequency counter circuitry. The sponge, or foam, rubber member 34 on the reader head 17 is adapted to abut the mask 16, with the apertures 36 therein in alignment with the light sources 82. The photo-resistive elements 29 are mounted adjacent the other end of the apertures 36, within the reading head 17. The cable 47 (shown in FIGURE 4) connects the photo-resistive elements 29 in the reader head 17 to the read out unit 46, within which the indicator tubes 49 are mounted (only one of which is shown in FIGURE 6). The indicator tube 49 includes a single anode 84 and a plurality of cathodes 86 in the form of digits. One end or pole of each photo-resistive element is connected to the corresponding cathode while the other end or pole is connected to the negative side of a source of supply 88. The positive side of the D.-C. supply potential is connected through the current limiting potentiometer 80 to the anode 84 of the indicator tube. Whenever light of sufficient intensity strikes any of the photo-resistive elements 29, the resistance thereof decreases sufficiently to permit the indicator tube 49 to conduct sufficiently whereby the conducting cathode glows, and becomes clearly visible. Schematically, the digital cathodes 86 are shown spaced apart in a side-by-side relation, however, in the actual tube construction, it will be understood that each of the digital cathodes appear in a common viewing area. In use, only the energized cathode is clearly visible.

In the manufacture of photo-resistive cells, the resistance characteristics thereof vary considerably from cell to cell. In the system shown wherein the cells are connected in parallel circuit relation to the potential source 88 through the indicator tube 49, each photo-resistive cell must have similar resistance characteristics for the proper functioning of the system. If the cells do not have similar resistance characteristics, a compensating arrangement which may include means for adjusting the mounting position of the individual cells to a location nearer, or farther, from the counter light sources; painting or masking out a portion of the cells to effect their resistance characteristics; or including individual compensating resistors in series circuit connection with each cell, may be used, as will be well understood by those skilled in this art.

It will here be noted that the operation of my apparatus depends upon the light from the individual lamps 82 in the frequency counter, and does not depend upon the particular numeral, or digit, formed in the mask 16. The sensitivity of the photo-resistive cells must, however, be sufficiently great to provide proper functioning of the indicator tube. For this reason, cells which are highly sensitive to the predominant light frequency, or frequencies, of the lamps in the frequency counter are selected.

When frequent adjustment of the frequency counter is not required, as in the testing of electrical components being manufactured, for example, the use of the remote read out unit allows the frequency counter 10 and attached reader head 17 to be located at a remote point, such as, on a relay rack, or under a production bench. Valuable production or laboratory space is thereby gained by the small size of the remote read out unit. As mentioned above, with the bracket 51 shown in FIGURE 4, the remote read out unit may be attached to a bench surface or under a shelf in front of an operator.

For some applications, the read out unit may be made to fit on a conventional relay rack. In other applications, particularly where frequent adjustment of the frequency counter unit is required, a remote read out unit may not be convenient, or desirable. For such applications, it will be understood that the read out unit may be either attached to the face of the reader head, or formed integrally therewith, whereby an in-line read out is presented at the frequency counter panel.

Figures 7, 8:
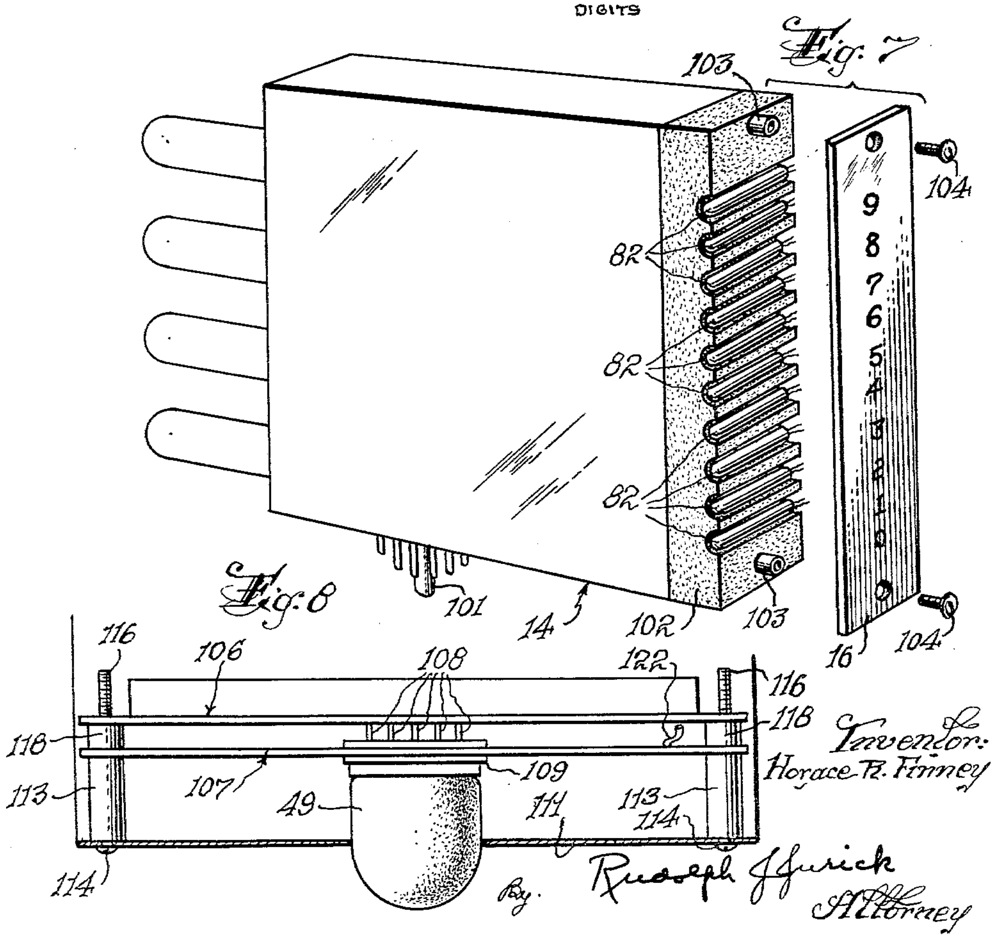
FIGURE 7 is a perspective view of a typical decade counter circuit with the mask removed therefrom.
FIGURE 8 is a side view of a converter which is adapted to be attached directly to the decade counter units of FIGURE 7.

In a further arrangement, each decade counter unit 14 of the frequency counter 10 is provided with an individual reader head unit and indicator tube. Reference is made to FIGURE 7, wherein there is shown a typical decade counter unit 14 removed from the frequency counter. Connections to the unit form the frequency counter are made through the terminals of a plug 101 at the bottom of the unit. The light sources 82 of the decade counter unit are suitably positioned on a supporting member 102. Internally threaded posts 103 extend from the front of the supporting member for securing the mask 16 thereto by screws 104 (the mask being shown removed therefrom, in FIGURE 7).

The decade counter unit of FIGURE 7, which is an example of a typical contemporary decade counter unit wherein the individual decimal values 0–9 appear at separate viewing areas, is easily converted to a unit wherein the information appears at a single viewing area, by use of a converter of the type shown in FIGURE 8. The converter of FIGURE 8, which includes a single numerical indicator tube 49, is adapted to be secured to the decade counter unit 14 on the posts 103, in place of the mask 16.

Figures 9, 10:
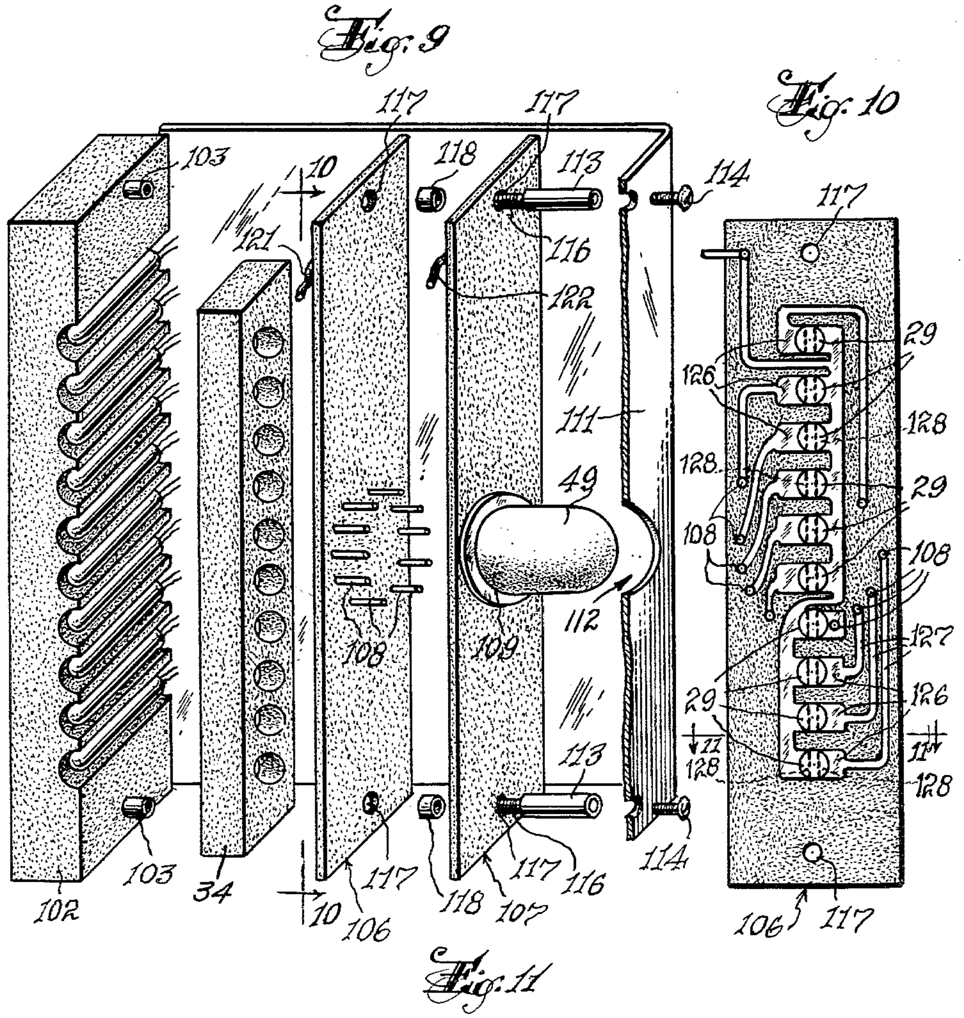
FIGURE 9 is an exploded perspective view of the converter of FIGURE 8 attached to the decade counter unit of FIGURE 7.
FIGURE 10 is a sectional view taken on line 10—10 of FIGURE 9.

Reference is now also made to FIGURE 9, wherein an exploded perspective view of the converter of my invention, and a fragmentary portion of the decade counter unit with the mask 16 removed therefrom, are shown. The converter includes first and second printed circuit boards 106 and 107, which are held in a spaced relationship by the cathode loads 108 which extend through the first board 106 and connect to the terminals of the indicator tube socket 109, in which the indicator tube 49 is plugged. The resilient member 34 with the apertures 36 therethrough is secured to the first board 106, as by cementing, or other suitable means. A generally U-shaped housing 111, having an aperture 112 therein through which the numerical indicator tube extends, is secured to the threaded posts 113 by screws 114. The posts 113 are provided with integrally formed threaded studs 116 which extend through apertures 117 in the printed circuit boards 106 and 107, and through spacer members 118. The studs are adapted to threadedly engage the threaded posts 103 on the supporting member 102, whereby the converter may be secured to the decade counter unit. Lead wires 121 and 122 from the first and second printed circuit boards 108 and 107, respectively, are adapted to connect to a suitable source of D.-C. potential in the frequency counter. The respective leads 121 and 122 connect to the cathode terminals 108 through the photo-resistive cells 29 (not shown in FIGURES 8 and 9) and to the indicator tube anode. From an examination of FIGURE 8, it will be apparent that the converter extends in depth an amount only slightly greater than the depth of the numerical indicator tube 49 whereby a very compact unit results. With a frequency counter having five decade counter units, as illustrated in FIGURE 1, it will be understood that each decade counter unit is provided with a converter of the type described whereby the read out is horizontally in-line, and easily read.

Operation of the photo-resistive cells 29 is adversely effected by high cell internal operating temperatures. To maintain the cells 29 at a relatively low operating temperature, I employ a novel printed circuit construction shown in FIGURES 10 and 11. Referring first to FIGURE 10, the photo-resistive cells 29 are shown suitably secured to the first printed circuit board 106. Connection to the photo-resistive cells is made through printed circuit terminals 126 which are of a generally rectangular shape, as viewed in FIGURE 10, the length and width thereof being greater than the width of the printed circuit leads, designated, generally, 127 and larger in size than the terminals 128 formed on the photo-resistive cells. By making the terminals 126 as large as is practically possible, the terminals act as heat sinks for the conduction of heat from the photo-resistive cells 29, whereby much heat is radiated from the terminals 126 into the surrounding atmosphere.

Figure 11:
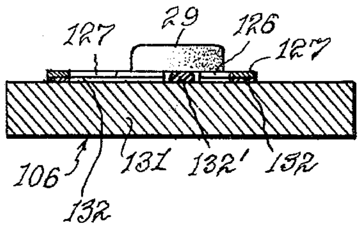
FIGURE 11 is an enlarged sectional view taken on line 11—11 of FIGURE 10.

Further cooling for the photo-resistive cells is provided by use of a novel printed circuit board 106 which includes a base of good heat-conducting metal rather than the usual insulating material. Reference is made to FIGURE 11 wherein an enlarged cross-sectional view of the board, taken on line 11—11 of FIGURE 10, is shown. The board 106 includes a base 131, made of aluminum, copper, or other metal having a high termal coefficient of conductivity. The electrical circuitry, comprising the leads 127 and terminals 126, is secured to the base by a bonding agent 132 having suitable insulating properties. The photo-resistive cells 29 are secured to the base 131 by use of the bonding agent, or glue, designated 132' in a manner wherein good electrical contact is obtained between the photo-resistive cell terminals, and the circuit terminals 126. Heat is easily conducted through the terminals 126 and bonding agent 132, to the large, massive, metallic base member 106, as well as directly through the bond 132' to the base member, which base provides a large radiating surface to the surrounding atmosphere.

In the drawings I have illustrated converter units which are suitable for use on decade counter units having the digit sources of illumination arranged in a straight-line manner. It will be understood, however, that my novel converter may be adapted for use with decade counter units with illumination sources which are arranged in any manner, or configuration. For example, decade counter units are employed in which the illumination sources representative of the consecutive digital output are arranged in a circular manner; the said illuminating sources comprising elements of an electronic tube. The converter of my invention is easily adapted for use on such devices by arranging the photo-sensitive cells in a circular pattern corresponding to the pattern of the light sources of the decade counter unit electron tube, whereby the photo-resistive cells are individually responsive to the illuminable tube elements.

It will here be noted that suitable indicator devices, other than the electron tube type 49 illustrated in the read out units, may be used in accordance with my invention. For example, in place of electronic tubes 49, the read out units may include electro-luminescent cells of the type having phosphoric layers sandwiched between an insulating member and a transparent, or glass member. Electrodes, in the form of bars, or the like, are located on opposite sides of the phosphoric layer. By energization of suitable combinations of the electrodes, the device is made to produce any of the digits corresponding to the digital read out of the counter. Other suitable indicator devices include stacks of glass plates each having an individual digit etched thereon. The digits may be made to appear by lighting the edge of the desired plate. It will also be understood, that in accordance with my invention, the read out units may include a suitable projection system wherein the illumination from the indicator device is passed through a lens, or lens system, and projected on a screen of frosted glass, or the like.

In the illustrated embodiments of my invention, the converter apparatus is adapted for use on frequency counters wherein the read out of a plurality of decade counter units is presented at the face thereof, which frequency counters are presently in commercial production and use. With the converter apparatus of my invention, the decade counter units of the frequency counter may be located at any convenient, or desirable, location within the frequency counter. A suitable reader head containing the photo-resistive elements, which are responsive to the light from the decade counter units located anywhere in the frequency counter, may be included in the construction of the frequency counter, whereby an in-line read out is available therefrom.

Having now described my invention in detail, in accordance with the requirements of the Patent Statutes, various other changes and modifications will suggest themselves to those skilled in this art, and it is intended that such changes and modifications shall fall within the spirit and scope of the invention as recited in the following claim.

I claim:

Apparatus for obtaining an in-line read-out of the information display of illuminable digits of decade counter units of a counting instrument comprising a reader head with a resilient member disposed over each counter unit and apertured for the passage of light only from the respective illuminated digits of said units, a corresponding number of photo-resistive elements disposed to receive light only through said apertures when the respective digits are illuminated and then decrease in resistance sufficiently to allow passage of actuating current, a read-out unit comprising a series of indicator tubes corresponding numerically with the decade counter units, each tube including a single anode and a plurality of cathodes in the form of digits, means connecting one pole of each photo-resistive element to the cathode of configuration conforming with the digit of the decade counter from which it receives light, a source of direct current, and means connecting the other pole of each photo-resistive element to the negative side and each anode to the positive side of said source of direct current, whereby the photo-resistive elements transmit current energizing only the digit cathodes corresponding with the illuminated decade counter digits.

References Cited in the file of this patent

UNITED STATES PATENTS

| | | |
|---|---|---|
| 2,142,106 | Boswau | Jan. 3, 1939 |
| 2,769,119 | Martin | Oct. 30, 1956 |
| 2,787,785 | Hunter | Apr. 2, 1957 |
| 2,794,977 | Stoddart | June 4, 1957 |
| 2,850,681 | Horton | Sept. 2, 1958 |
| 2,871,462 | Eggensperger et al. | Jan. 27, 1959 |
| 2,894,255 | Murphy | July 7, 1959 |
| 2,921,300 | Zysf | Jan. 12, 1960 |
| 2,950,418 | Reis | Aug. 23, 1960 |
| 2,959,349 | Marsh et al. | Nov. 8, 1960 |
| 2,962,698 | Mathamel | Nov. 29, 1960 |
| 2,994,077 | Terhune | July 25, 1961 |

FOREIGN PATENTS

| | | |
|---|---|---|
| 357,436 | Switzerland | June 14, 1957 |